United States Patent
Dharmarajan et al.

(10) Patent No.: US 7,435,781 B2
(45) Date of Patent: Oct. 14, 2008

(54) POLYMERS FOR ELECTRICAL APPLICATIONS

(75) Inventors: Narayanaswami Raja Dharmarajan, Houston, TX (US); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/958,243

(22) Filed: Oct. 5, 2004

(65) Prior Publication Data

US 2006/0074177 A1    Apr. 6, 2006

(51) Int. Cl.
*C08L 23/04*    (2006.01)
*C08L 23/10*    (2006.01)

(52) U.S. Cl. .................. 525/240; 525/242; 525/244; 525/315; 524/515; 524/525; 524/534

(58) Field of Classification Search ........... 525/240, 525/242, 244, 315; 526/351, 352; 428/523, 428/35.1, 34.9, 36.9, 910, 379; 524/515, 524/525, 534
See application file for complete search history.

(56) References Cited

U.S. PATENT DOCUMENTS

| 4,088,714 | A | 5/1978 | Huff ..................... 260/897 |
| 5,674,613 | A | 10/1997 | Dharmarajan et al. |
| 5,763,533 | A | 6/1998 | Dharmarajan et al. |
| 5,952,427 | A | 9/1999 | Dharmarajan et al. |
| 5,990,235 | A * | 11/1999 | Terano ..................... 525/53 |
| 6,150,467 | A | 11/2000 | Dharmarajan et al. |
| 6,270,856 | B1 | 8/2001 | Hendewerk et al. |
| 6,271,311 | B1 | 8/2001 | Ravishankar et al. |
| 6,326,434 | B1 | 12/2001 | Lee et al. ..................... 525/194 |
| 6,376,610 | B1 | 4/2002 | Dharmarajan et al. |
| 6,525,157 | B2 | 2/2003 | Cozewith et al. |
| 6,552,112 | B1 | 4/2003 | Redondo et al. ............ 524/436 |
| 2004/0059061 | A1 | 3/2004 | Jourdian et al. |

FOREIGN PATENT DOCUMENTS

| EP | 0 164 190 | 11/1985 |
| EP | 0 893 801 | 4/2004 |
| EP | 893801 B1 * | 4/2004 |

OTHER PUBLICATIONS

Ravishankar, et al. "Advanced EPDM for Wire and Cable Applications", Rubber World, vol. 219, No. 3, Dec. 1998, pp. 23-30, 57.

Pehlert, et al. "EPDM-Metallocene Plastomer Blends for Wire and Cable", Rubber World, vol. 226, No. 2, May 2002.

* cited by examiner

*Primary Examiner*—Robert D. Harlan

(57) ABSTRACT

Electrical insulation compounds are disclosed, the insulation compounds including an ethylene polymer comprising at least 40 wt % ethylene-derived units and having a density of $\leq 0.91$ g/cm³ and a propylene polymer comprising at least 75 wt % propylene-derived units and having an isotactic propylene triad tacticity of from 65% to 99%. Also disclosed are electrical devices including the electrical insulation compounds.

18 Claims, No Drawings

POLYMERS FOR ELECTRICAL APPLICATIONS

FIELD OF THE INVENTION

The present invention is directed generally to polymer blends including an ethylene polymer having at least 40 wt % ethylene-derived units and a density of $\leq 0.91$ g/cm$^3$, a propylene polymer having at least 75 wt % propylene-derived units and an isotactic propylene triad tacticity of from 65% to 99%, and optionally an LDPE. The present invention is also directed to the use of such blends as insulation compounds for electrical applications, and to electrical devices including such compounds.

BACKGROUND

A variety of polymeric materials have been utilized as electrical insulating materials for power cables and other electrical devices. Typical insulation compounds include elastomers such as ethylene-propylene copolymers (EP) and ethylene-propylene-diene terpolymers (EPDM), collectively referred to herein as EP(D)M. These insulation compounds are applied as an insulation member over either a metallic conductor or a semi-conductive substrate in a multi-step extrusion process.

EP(D)M polymers used in electrical applications generally contain fillers within the range of from 40 to 100 parts per hundred parts by weight of rubber (phr) to achieve acceptable mechanical properties and extrusion processability. The addition of filler, however, increases power loss through the cable. In the power transmission and distribution industry, power loss is associated with cost debits. The cost associated with power loss is proportional to the voltage, and becomes significant in medium voltage applications (5 to 69 kV) and even more significant in high voltage applications (>69 kV).

U.S. Pat. No. 5,674,613 discloses filled electrical insulation compounds comprising an ethylene, propylene, 5-vinyl-2-norbornene elastomeric polymer having a branching index up to 0.4 and a Mw/Mn greater than 10 and an elastomeric polymer of an ethylene-α-olefin copolymer having a Mw/Mn less than 3, a CDBI greater than 50% and a density in the range of from 0.86 to 0.92 g/cm$^3$.

U.S. Pat. No. 6,270,856 discloses an electrical insulating layer comprising an ethylene-α-olefin copolymer, optionally including a diene, and having a density of from about 0.86 to about 0.96 g/cm$^3$, a melt index of from about 0.2 to about 100 dg/min, a molecular weight distribution of from about 1.5 to about 30, and a composition distribution breadth index greater than about 45%. The insulating layer may contain neat (i.e., unfilled) or filled polymer.

Semicrystalline polypropylenes having at least 75 wt % propylene-derived units and a triad tacticity of greater than 75% are known. See, for example, U.S. Pat. No. 6,525,157. U.S. Patent Application Publication No. 2004-0059061 describes semicrystalline polypropylenes blended with EP(D)M to form one component of a multiple component structure useful in, for example, automobile glass run channels and door seals.

SUMMARY

It has been surprisingly found that electrical insulation compounds can be prepared with a novel blend comprising an ethylene polymer having at least 40 wt % ethylene-derived units and a density of $\leq 0.91$ g/cm$^3$, a propylene polymer having at least 75 wt % propylene-derived units and an isotactic propylene triad tacticity of from 65% to 99%, an LDPE, and low levels of filler (0 to less than 25 phr), while still maintaining suitable extrudability and mechanical properties.

In one embodiment, the present invention provides a polymer blend comprising an ethylene polymer, a propylene polymer, and an LDPE. The ethylene polymer comprises at least 40 wt % ethylene-derived units and has a density of $\leq 0.91$ g/cm$^3$. The propylene polymer comprises at least 75 wt % propylene-derived units and has an isotactic propylene triad tacticity of from 65% to 99%. In a particular aspect of this embodiment, the polymer blend is used as an electrical insulation compound. In another particular aspect of this embodiment, the polymer blend includes less than 25 phr filler.

In another embodiment, the present invention provides an electrically conductive device including an electrically conductive portion and an electrically insulating portion. The insulating portion includes an electrical insulation compound which comprises an ethylene polymer having at least 40 wt % ethylene-derived units and a density of $\leq 0.91$ g/cm$^3$ and a propylene polymer having at least 75 wt % propylene-derived units and an isotactic propylene triad tacticity of from 65 to 99%. In a particular aspect of this embodiment, the insulation compound includes less than 25 phr filler. In another particular aspect of this embodiment, the device is a medium voltage power cable.

DETAILED DESCRIPTION

It should be understood by those of ordinary skill in the art that the insulating portion of an electrically conductive device may contain multiple layers of material. For purposes of the present invention, either one or some or all layers of the insulating portion may comprise the novel electrical insulation compound described herein.

In one embodiment, the present invention is directed to an electrical insulation compound which includes a blend comprising an ethylene polymer, such as an EP(D)M, and at least 10 wt % of a propylene polymer having an isotactic propylene triad tacticity of from 65% to 99%. The presence of the propylene polymer in the blend allows for extrudability and good mechanical properties, such as tensile strength and elongation, in the insulation compound. For example, in some embodiments, the compositions disclosed herein have a tensile strength of at least 6.9 MPa, or at least 4.8 MPa, or at least 3.4 MPa; and, in some embodiments, the compositions disclosed herein have a break elongation of at least 200%, or at least 150%, or at least 100%.

In one embodiment, a low crystallinity, elastomeric ethylene polymer, prone to processability difficulties can be blended with a low crystallinity propylene polymer to provide overall improved processability in the substantial absence of filler (i.e., less than 1 phr of filler) and while maintaining the option of curing the polymer.

The improved extrudability and mechanical properties of the compositions disclosed herein minimize the need for filler reinforcements. Therefore, some embodiments of the present invention do not contain reinforcing filler or contain reduced amounts of filler, e.g. less than 25 phr, or less than 20 phr, or less than 15 phr, or less than 10 phr, or less than 5 phr, or less than 1 phr, which results in a low dissipation factor relative to similar compositions containing fillers. For example, in some embodiments, the compositions disclosed herein have a 28 day dissipation factor of $\leq 0.01$, or $\leq 0.005$, or $\leq 0.003$ or $\leq 0.0028$.

As used herein, the term "compound" is used to mean a polymer component or components in combination with fillers, accelerants, curatives, extenders, and other additives well known in the art.

Ethylene Polymer

Embodiments of the present invention include an ethylene polymer. Polymers useful as the ethylene polymer in the present invention include ethylene polymers having suitable mechanical and dielectric properties such that they are useful as electrical insulating material in power cable applications. Examples of such polymers include EP(D)M materials known in the art, such as, but not limited to, those taught in U.S. Pat. Nos. 6,270,856; 5,952,427; 6,562,920; 6,376,610; 6,271,311; 6,150,467; 5,763,533; 5,674,613; U.S. Patent Application Publication No. 2004/0118592; PCT Publication No. WO04/009694; P. S. Ravishankar and N. R. Dharmarajan, "Advanced EPDM for wire and cable applications," Rubber World, Vol. 219, No. 3, December 1998, 23–30; G. J. Pehlert, N. R. Dharmarajan, and P. S. Ravishankar, "EPDM-metallocene plastomer blends for wire and cable," Rubber World, May 2002; and European Patent 843878; the disclosures of which are hereby fully incorporated by reference herein.

In a particular embodiment, the ethylene polymer has a Mooney viscosity (ML [1+4] 125° C.) ranging from 10 to 80, as measured according to ASTM D 1646-94, a density within the range of 0.85 to 0.91 g/cm$^3$, as measured according to ASTM D 1505 98, and a melt index $I_2$ within the range having a lower limit of 0.1 dg/min, or 0.2 dg/min, or 0.5 dg/min, or 1.0 dg/min to an upper limit of 10 dg/min, or 50 dg/min, or 100 dg/min, as measured according to ASTM D-1238 (190° C./2.16 kg).

In a particular embodiment, the ethylene polymer comprises ethylene polymerized with at least one $C_3$ to $C_{20}$ $\alpha$-olefin, preferably $C_3$ to $C_{12}$, and optionally one or more polyenes. The monomer content of the ethylene polymers depends on economics and the desired applications of the resultant cable. Typically the ethylene polymers will comprise ethylene-derived units in a range from a lower limit of 40, or 50, or 60, or 65, or 68 wt % to an upper limit of 80 or 85 or 90 wt %, based on the total weight of monomer-derived units in the polymer.

In a particular aspect of this embodiment, the ethylene polymer generally contains $\alpha$-olefin-derived units in a range from a lower limit of 10 or 15 or 20 wt % to an upper limit of 30 or 35 or 40 or 50 or 60 wt %, based on the total weight of monomer-derived units in the polymer. The $\alpha$-olefin can be linear or branched, and two or more comonomers can be used. Illustrative non-limiting examples of preferred $\alpha$-olefins useful as comonomers are propylene, 1-butene, 1-pentene, 1-hexene, 1-octene, and 1-dodecene.

In another particular aspect of this embodiment, the ethylene polymer optionally contains non-conjugated diene-derived units in a range of from a lower limit of 0.1, or 0.15, or 0.2, or 0.25, or 0.3, or 0.5, or 1 wt % to an upper limit of 1.5, or 2, or 3, or 5, or 10 wt %, based on the total weight of monomer-derived units in the polymer. Illustrative non-limiting examples of preferred non-conjugated dienes useful as comonomers are straight or branched chain hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. In a preferred embodiment, the non-conjugated diene is selected from the group consisting of 5-ethylidene-2-norbornene (ENB); 1,4-hexadiene; dicyclopentadiene (DCPD); norbornadiene; and 5-vinyl-2-norbornene (VNB). Polymerization of the non-conjugated dienes into the ethylene polymer backbone sometimes renders long chain branching characteristics to the polymer that manifests as improvements in extrusion processability.

In another particular embodiment, the ethylene polymer is a random ethylene interpolymer made at relatively high polymerization temperatures of over 100° C. in order to form polymers with high levels of long chain branches. In a particular aspect of this embodiment, the interpolymer contains at least 55 mol % of ethylene-derived units, from 0 to 5 mol % of a diene, and the balance of units derived from propylene and/or 1-butene. In a particular aspect of this embodiment, the ethylene interpolymer has a density of from 0.85 to 0.91 g/cm$^3$, an MI of from 0.01 to 100 g/10 min, an MIR ($I_{21}/I_2$) of from 30 to 400, and is obtained by solution polymerization using a transition metal complex as a catalyst and a non-coordinating anion, and has a level of NCA derived residue as determined by boron content of less than 0.5 ppm (parts per million parts of polymer) as determined by Internally Coupled Plasma Atomic Emissions Spectroscopy ("ICP AES"). Such ethylene interpolymer is further described in co-pending U.S. Provisional Patent Application No. 60/555,914, the disclosure of which is hereby fully incorporated herein by reference.

In yet another particular embodiment, the ethylene polymer is Vistalon™ 1703P, a commercially available highly long-chain branched EPDM available from ExxonMobil Chemical Co., Houston, Tex. Vistalon™ 1703P comprises 0.9 wt % units derived from vinyl norbornene (as measured according to ASTM D 6047) and 76.8 wt % ethylene-derived units (as measured according to ASTM D 3900 A), and has a Mooney Viscosity, ML (1+4) at 125° C. of 25 (as measured according to ASTM D 1646 modified (1)).

In yet another particular embodiment, the ethylene polymer is selected from EXACT™ polymers available from the ExxonMobil Chemical Co., Houston, Tex., and ENGAGE™ and NORDEL™ polymers available from DuPont Dow Elastomers. Illustrative, non-limiting examples of preferred EXACT™ polymers include EXACT™ 0201, EXACT™ 0201HS, EXACT™ 0203, EXACT™ 8201, EXACT™ 8203, EXACT™ 210, and EXACT™ 8210.™

In some embodiments, the ethylene polymer component is a combination of any two or more ethylene polymers.

The amount of ethylene polymer present in the electrical insulation compounds of the present invention is typically within the range having a lower limit of 10 wt %, or 20 wt %, or 30 wt %, or 40 wt % to an upper limit of 50 wt %, or 60 wt %, or 70 wt %, or 80 wt %, or 90 wt %, based on the combined weight of the ethylene polymer and propylene polymer.

The ethylene polymers suitable in the invention are not limited by any particular polymerization method of preparation or by any particular type of reaction vessel. In one particular embodiment, the ethylene polymer is produced using a Ziegler-type catalyst system such as one of those described in Japanese laid open patent applications JP 151758 and JP 210169, the disclosures of which are hereby fully incorporated herein by reference. In another particular embodiment, one of the various metallocene catalyst systems is used to polymerize the ethylene polymer including, but not limited to those of the homogeneous, supported catalyst type, wherein the catalyst and cocatalyst are together supported or reacted together onto an inert support for polymerization by a gas phase process, high pressure process, or a slurry, solution polymerization process. In another particular embodiment, the catalyst system used to produce the ethylene polymer includes a Hf-containing metallocene catalyst, such as but not limited to dimethyl silyl bis(indenyl) hafnium dimethyl, and a non-coordinating anion activator, such as but not limited to dimethyl anilinium tetrakis(heptafluoronaphthyl) borate.

Propylene Polymer

The propylene polymer of the present invention is a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene polymer are reduced compared to highly isotactic polypropylene by the introduction of errors in the insertion of propylene and/or by the presence of comonomer.

The crystallinity of the propylene polymer may be expressed in terms of heat of fusion. In particular embodiments, the propylene polymer has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g.

The crystallinity of the propylene polymer can also be expressed in terms of crystallinity percent. The thermal energy for the highest order of polypropylene is estimated at 189 J/g. That is, 100% crystallinity is equal to 189 J/g. Therefore, in particular embodiments, the propylene polymer has a propylene crystallinity within the range having an upper limit of 65%, or 40%, or 30%, or 25%, or 20%, and a lower limit of 1%, or 3%, or 5%, or 7%, or 8%.

The level of crystallinity is also reflected in the melting point. The term "melting point," as used herein is the highest peak among principal and secondary melting peaks, as determined by DSC. In particular embodiments, the propylene polymer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

The propylene polymer generally comprises at least 75 wt % propylene-derived units, and in particular embodiments, the propylene polymer comprises at least 80 wt %, or at least 90 wt % propylene-derived units.

The propylene polymers suitable in the present invention have an isotactic propylene triad tacticity within the range having a lower limit of 65%, or 70%, or 75% to an upper limit of 97%, or 98%, or 99%. The isotactic propylene triad tacticity of a polymer is the relative tacticity of a sequence of three adjacent propylene units, a chain consisting of head to tail bonds, expressed as a binary combination of m and r sequences. The isotactic propylene triad tacticity of the polymers disclosed herein was determined using $C^{13}$NMR and the calculations outlined in U.S. Pat. No. 5,504,172.

In some embodiments, the crystallinity of the propylene polymer is reduced by the copolymerization of propylene with limited amounts of one or more comonomers selected from: ethylene, $C_4$–$C_{20}$ alpha-olefins, and polyenes. In these copolymers, the amount of propylene-derived units present in the propylene polymer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene polymer. The amount of optional units derived from ethylene and/or $C_4$–$C_{20}$ alpha-olefins present in the propylene polymer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene polymer. The amount of optional polyene-derived units present in the propylene polymer ranges from an upper limit of 25 wt %, or 20 wt %, or 15 wt %, or 10 wt %, or 7 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene polymer.

Non-limiting examples of preferred α-olefin(s) optionally present in the propylene polymer include propylene, 1-butene, 1-pentene, 1-hexene, 1-octene, and 1-dodecene. The polyene-derived units optionally present in the propylene polymer may be derived from any hydrocarbon structure having at least two unsaturated bonds wherein at least one of the unsaturated bonds may be incorporated into a polymer. Non-limiting examples of preferred polyenes include 5-ethylidene-2-norbornene ("ENB"), 5-vinyl-2-norbornene ("VNB"), divinyl benzene ("DVB"), and dicyclopentadiene ("DCPD").

In a particular embodiment, the propylene polymer has a Mooney viscosity ML(1+4) at 125° C. of from 0.5 to 100, or from 5 to 40, or from 10 to 40.

Illustrative non-limiting examples of suitable propylene polymers, as well as the methods for preparing them, include the "FPC" disclosed in pending U.S. Provisional Patent Application No. 60/519,975; the "isotactic propylene copolymer" disclosed in U.S. Patent Application Publication No. 2003/0204017; the "propylene ethylene copolymers" disclosed in U.S. Pat. No. 6,525,157; and the "propylene ethylene copolymers" disclosed in PCT Publication No. WO02/083754, the disclosures of which are hereby fully incorporated herein by reference.

Separate from, or in combination with the foregoing, the crystallinity of the propylene polymer can be reduced also by stereo-irregular incorporation of the propylene-derived units, which can be influenced by, for example, the choice of catalyst and polymerization temperature.

The propylene polymers of the present invention are not limited by any particular polymerization method of preparation, and the polymerization processes described herein are not limited by any particular type of reaction vessel.

In a particular embodiment, the catalyst system used to produce the propylene polymer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another particular embodiment, the catalyst system used to produce the propylene polymer includes a Hf-containing metallocene catalyst, such as but not limited to dimethyl silyl bis(indenyl) hafnium dimethyl, and a non-coordinating anion activator, such as but not limited to dimethyl anilinium tetrakis(heptafluoronaphthyl) borate.

In yet another particular embodiment, the propylene polymer is produced using any of the catalyst systems and polymerization methods disclosed in U.S. Patent Application Publication 2004/0024146, the disclosure of which is hereby incorporated herein by reference.

In yet another particular embodiment, the propylene polymer is produced using a catalyst system such as one of the nonmetallocene, metal-centered, heteroaryl ligand catalyst systems described in U.S. Patent Application Publication 2003/0204017, the disclosure of which is hereby incorporated herein by reference.

Further general process condition information suitable for use in preparing the propylene polymers can be found in disclosures including, but not limited to U.S. Pat. No. 5,001, 205 and PCT publications WO96/33227 and WO97/22639. Further information on gas phase polymerization processes can be found in disclosures including, but not limited to U.S. Pat. Nos. 4,543,399; 4,588,790; 5,028,670; 5,317,036; 5,352, 749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. Information relating to methods of introducing liquid catalyst systems into fluidized bed polymerizations into a particle lean zone can be found in disclosures including, but not limited to U.S. Pat. No. 5,693,727. Further information on slurry polymerization processes can be found in disclosures including, but not limited to U.S. Pat. Nos. 3,248,179 and 4,613,484. PCT publication WO 96/08520 and U.S. Pat. No. 5,712,352 are non-limiting examples of disclosures which describe a polymerization process operated in the absence of or essentially free of any scavengers.

The amount of propylene polymer present in the electrical insulation compounds of the present invention is typically within the range having a lower limit of 10 wt %, or 20 wt %, or 30 wt %, or 40 wt % to an upper limit of 50 wt %, or 60 wt %, or 70 wt %, or 80 wt %, or 90 wt %, based on the combined weight of the ethylene polymer and propylene polymer.

Additional Polymer Components

In some embodiments, the physical and mechanical properties and electrical performance of the blends described herein are enhanced by the addition of a low density polyethylene and the resulting compounds are processable without filler reinforcements. The term low density polyethylene ("LDPE") is used herein to describe an ethylene polymer made in a high pressure process (in a tubular reactor or an autoclave) at a pressure of from 1000 to 3500 bar and at a temperature within the range of from 150 to 400° C. High pressure polymerization is triggered by the use of free radical initiation. As a result, the polymerization mechanism leads to the formation of different length branches, which can assist in the extrusion of a polymer compound in which LDPE is incorporated. The term excludes all polymers made by processes at lower temperatures and pressures using conventional Ziegler Natta catalysts and metallocenes, including linear polyethylene such as the HDPE and LLDPE types. In a particular embodiment, the LDPE is Escorene LD400™.

Extruded Compounds

The electrical insulation compounds described herein can be processed using conventional mixing and extruding techniques. Preferably, the compounds are extruded at relatively high extrusion rates, while still maintaining a smooth extrusion surface. The compounds of the present invention maintain good extrudability, as characterized by high line speeds, and absence of visible melt fracture on the surface of the extrudates.

The compounds described herein may be crosslinked by methods well known in the art using, for example, silane or peroxide as a curative.

EXAMPLES

Certain features and advantages of embodiments of the invention are illustrated by the following, non-limiting examples.

Test Methods

Heat of fusion. The heat of fusion of the polymers described herein can be measured as follows. About 6 to 10 mg of a sheet of the polymer pressed at approximately 200° C. to 230° C. is removed with a punch die and annealed at room temperature for 24–48 hours. At the end of this period, the sample is placed in a Differential Scanning Calorimeter (Perkin Elmer Pyris Analysis System) and cooled to about −50° C. to −70° C. The sample is heated at about 20° C./min to attain a final temperature of about 180° C. to 200° C. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion.

In the Examples, the different tests and measurements are performed according to the protocols below unless otherwise mentioned:

TABLE 1

Test Methods

| Parameter | Test Method | Units |
|---|---|---|
| Ethylene content | ASTM D 3900 FTIR method | wt % |
| Diene content | | |
| Mooney Viscosity ML (1 + 4) @ 125° C. | ASTM D 1646-94 | Mooney units |
| Cure Characteristics | ASTM D 2084-93 | |
| $M_L$ | | dN-m |
| $M_H$ | | dN-m |
| ts2 | | min |
| tc90 | | min |
| tc98 | | min |
| cure rate | | dN-m/min |
| cure state ($M_H - M_L$) | | dN-m |
| Physical Properties | | |
| 100% Modulus | ASTM D 412-92 | MPa |
| 200% Modulus | ASTM D 412-92 | MPa |
| 300% Modulus | ASTM D 412-92 | MPa |
| Tensile Strength | ASTM D 412-92 | MPa |
| Break Elongation | ASTM D 412-92 | % |
| Hardness | ASTM D-2240-91 | Shore A |
| Electrical Performance Dissipation factor Dielectric constant | ASTM D 150-98 (samples aged in water @ 90° C., 600 V alternating current source at 60 Hz) | % none |
| Melt Index | ASTM D 1238 | g/10 min |
| Melt Index Ratio | ASTM D 1238 | none |
| Density | ASTM D 1505 98 | g/cm³ |

Polymers Used

Certain characteristics of the ethylene polymer, propylene polymer, and LDPE polymer used in the Examples herein are shown in Table 2.

The ethylene polymers used herein are Vistalon™ 1703P, and EP-1. Vistalon™ 1703P is an EPDM with vinyl norbornene ("VNB") as the diene, made with a conventional Ziegler-Natta catalyst. The VNB introduced into the polymer backbone provides extensive long chain branching, which renders good compound extrusion processability, producing compound extrudates that are relatively free of melt fracture. Vistalon™ 1703P has been used commercially in wire and cable applications, and is available from ExxonMobil Chemical Co., Houston, Tex.

EP-1 is a metallocene-catalyzed random ethylene-propylene polymer which can be made according to the following procedure. Polymerization is carried out in a single-phase, liquid-filled, stirred tank reactor with continuous flow of feeds to the system and continuous withdrawal of products under equilibrium conditions. Polymerization is done in system with a solvent comprising predominantly $C_6$ alkanes, referred to generally as "hexane" solvent, using soluble dimethyl silyl bis(indenyl) hafnium dimethyl as the catalyst and dimethyl anilinium tetrakis (heptafluoro-naphthyl) borate as co-catalyst. The polymerization is run at high temperatures (e.g., from 140° C. to 160° C.).

All feeds are pumped into the reactors by metering pumps, except for the ethylene, which flows as a gas through a mass flow meter/controller. Reactor temperature can be controlled adiabatically by controlled chilling of the feeds and using the heat of polymerization to heat the reactor. Feed temperature can range from −20° C. to 40° C. or higher. Typical feed temperatures are kept at 10° C. for high conversion runs and as high as 25° C. for high temperature runs.

The reactors are maintained at a pressure in excess of the vapor pressure of the reactant mixture to keep the reactants in the liquid phase. In this manner the reactors are operated liquid full in a homogeneous single phase. Ethylene and propylene feeds are combined into one stream and then mixed with a pre-chilled hexane stream. A hexane solution of a tri-n-octyl aluminum scavenger is added to the combined solvent and monomer stream just before it enters the reactor to further reduce the concentration of any catalyst poisons. A mixture of the catalyst components in solvent is pumped separately to the reactor and entered through a separate port.

The reaction mixture is stirred aggressively using a magna-drive system with three directionally opposed tilt paddle stirrers set to about 750 rpm to provide thorough mixing over a broad range of solution viscosities. Flow rates are set to maintain an average residence time in the reactor of about 10 minutes. On exiting the reactor the copolymer mixture is subjected to quenching, a series of concentration steps, heat and vacuum stripping and pelletization.

The general conditions may be as described in WO 99/45041 incorporated herein for US purposes. Water is then supplied to kill the polymerization reaction, which might otherwise continue in the presence of surviving catalyst, unreacted monomer, and elevated temperature.

The effluent of the continuous stirred tank reactor is passed to heat exchangers to raise the temperature to 220° C. Liquid phase separation is then effected by a rapid pressure drop as the polymerization mixture passes through a let-down valve in a liquid phase separation vessel, in which the pressure drops quickly from 100 Bar to 40 Bar. Inside the vessel an upper lean phase is formed with less than 0.1 wt % of polymer and a lower polymer rich phase with 30 to 40 wt % of polymer. After further removal of solvent and monomer in a low-pressure separator and devolatilizer, pelletized polymer can be removed from the plant.

It should be appreciated that Vistalon™ 1703P and EP-1 are merely exemplary, and numerous other ethylene-α-olefins and ethylene-α-olefin-dienes can be used in the embodiments described herein.

The propylene polymer used herein is PP-1, a metallocene-catalyzed random polypropylene having 18 wt % ethylene-derived units and 3 wt % units derived from ethylidene norbornene ("ENB"). PP-1 can be prepared using the following procedure. In a 27 liter continuous flow stirred tank reactor equipped with a dual pitch blade turbine agitator, 92 Kg of dry hexane, 34 Kg of propylene, 1.8 Kg of ethylene, 1.1 Kg of 5-ethylidene-2-norbornene (ENB) per hour are added. The reactor is agitated at 650 rpm during the course of the reaction and is maintained liquid full at 1600 psi (11.03 MPa) pressure (gauge) so that all regions in the polymerization zone have the same composition during the entire course of the polymerization. A catalyst solution in toluene of 1.5610–3 grams of dimethyl silyl bis(indenyl) hafnium dimethyl and 2.4210–3 grams of dimethylanilinium tetrakis (heptafluoronaphthyl) borate are added at a rate of 6.35 ml/min to initiate the polymerization. An additional solution of tri-n-octyl aluminum (TNOA) is added as a scavenger. The polymerization is conducted at 59° C. and the temperature is maintained during the polymerization by adding pre-chilled hexane at a temperature between −3° C. and 2° C. The polymer is recovered by two stage removal of the solvent, first by removing 70% of the solvent using a lower critical solution process as described in WO0234795A1, and then removing the remaining solvent in a LIST devolatization extruder. The polymer is recovered as pellets about a ⅛ to ¼ inch in principal axes.

The LDPE used herein is Escorene LD400™, an LDPE designed for wire and cable applications, commercially available from ExxonMobil Chemical Co., Houston, Tex.

TABLE 2

Polymer Characteristics

| Polymer | Vistalon ™ 1703P | EP-1 | PP-1 | Escorene ™ LD 400 |
|---|---|---|---|---|
| Diene | Vinyl norbornene | N/A | Ethylidene norbornene | N/A |
| Mooney Viscosity (1 + 4) @ 125° C. | 25 | * | 18 | * |
| Ethylene (wt %) | 76 | 74 | 18 | * |
| Comonomer | $C_3$ | $C_3$ | $C_2$ | N/A |
| Diene (wt %) | 0.9 | 0 | 3 | 0 |
| Mn (g/mol) | 36000 | * | * | * |
| Mw/Mn | >10 | 2.4 | 2.4 | * |
| Branching Index | 0.1 | 0.95 | 0.95 | * |
| Density (g/cm$^3$) | 0.870 | 0.870 | 0.870 | 0.921 |
| Melt Index (g/10 min) | * | 1.0 | * | 2.25 |

*not measured

Additives Used

Agerite MA is a hydroquinoline antioxidant available from R.T. Vanderbilt Company, Inc., Norwalk, Conn.

Triallyl cyanurate (TAC) is a crosslinking agent.

DiCup® R is dicumyl peroxide, a crosslinking agent available from Geo Specialty Chemicals, Cleveland, Ohio.

Formulations

Compounds as described below were mixed in a 1600 cm$^3$ Banbury mixer using a batch weight of about 1350 gm. The compounds discharged from the Banbury mixer were sheeted out in a two roll mill. The mill additives were added to about 400 gm on the mill. The batch was homogenized several times on the mill to facilitate uniform dispersion of the additives. The mill temperature was maintained around 90° C. during the compound finalization.

Examples 1–4

Table 3 shows the cure characteristics, physical properties, and electrical performance of unfilled compounds containing blends of EP-1 and PP-1, except Example 1 which is a formulation that contains only EP-1. The formulation of Example 1 has good vulcanizate and electrical properties, but is not extrudable. With the addition of PP-1, as in Examples 2–4, the tensile strength and break elongation is enhanced relative to Example 1.

TABLE 3

Unfilled Formulations With EP-1/PP-1 Blend

| EXAMPLE | 1 | 2 | 3 | 4 |
|---|---|---|---|---|
| Materials Used | | | | |
| EP-1 (phr) | 100 | 75 | 50 | 25 |
| PP-1 (phr) | 0 | 25 | 50 | 75 |
| Agerite MA (phr) | 0 | 0.5 | 0.5 | 0.5 |
| TAC (phr) | 0 | 0.4 | 0.4 | 0.4 |
| Mill Addition: | | | | |
| Agerite MA (phr) | 0.5 | 0 | 0 | 0 |
| TAC (phr) | 0.4 | 0 | 0 | 0 |
| DiCup R (phr) | 2.6 | 2.6 | 2.6 | 2.6 |
| Cure Characteristics (ODR - 200° C., 3° Arc, 6 min motor) | | | | |
| $M_L$ (dN-m) | 3.88 | 4.34 | 3.85 | 2.87 |
| $M_H$ (dN-m) | 105.2 | 115.3 | 51.6 | 38.1 |
| ts2 (min) | 0.54 | 0.72 | 0.82 | 0.82 |
| tc90 (min) | 1.77 | 2.0 | 2.3 | 2.16 |
| tc98 (min) | 2.31 | 2.51 | 2.89 | 2.66 |
| cure rate (dN-m/min) | 115.8 | 131.5 | 39.2 | 31.0 |
| cure state $M_H - M_L$ (dN-m) | 101.3 | 110.9 | 47.8 | 35.3 |
| Physical Properties (Press cured 20 min, 165° C.) | | | | |
| Hardness (Shore A) | 60 | 59 | 63 | 60 |
| 100% Modulus (MPa) | 1.3 | 1.4 | 1.7 | 1.5 |
| 200% Modulus (MPa) | 1.5 | 1.6 | 1.9 | 1.8 |
| 300% Modulus (MPa) | 1.8 | 1.8 | 2.4 | 2.3 |
| Tensile Strength (MPa) | 2.1 | 3.2 | 4.3 | 10.6 |
| Break Elongation (%) | 346 | 472 | 399 | 511 |
| Dissipation Factor (600 V, 60 Hz, room temperature) (days in 90° C. water) | | | | |
| Original, 0 days (dry) | 0.0003 | 0.0003 | 0.0005 | 0.0010 |
| 1 day | 0.0010 | 0.0031 | 0.0010 | 0.0032 |
| 7 days | 0.0002 | 0.0012 | 0.0013 | 0.0029 |
| 14 days | 0.0012 | 0.0005 | 0.0012 | 0.0029 |
| 21 days | 0.0005 | 0.0005 | 0.0002 | 0.0046 |
| 28 days | 0.0005 | 0.0006 | 0.0002 | 0.0027 |

Examples 5–10

Table 4 shows the cure characteristics, physical properties, and electrical performance of unfilled compounds containing blends of EP-1, PP-1, and Escorene LD400™ except Example 5 which is a formulation that contains only EP-1 and PP-1. The progressive addition of Escorene LD400™ increases the tensile strength relative to Example 5. The dissipation factor after 28 days aging in water becomes lower (i.e., improves) in Examples 9 and 10, which contain Escorene LD400™ at 25 and 30 phr (or wt %?), respectively.

TABLE 4

Unfilled Formulations With EP-1/PP-1/LDPE Blend

| EXAMPLE | 5 | 6 | 7 | 8 | 9 | 10 |
|---|---|---|---|---|---|---|
| Materials Used | | | | | | |
| EP-1 (phr) | 75 | 67.5 | 63.75 | 60 | 56.25 | 52.5 |
| PP-1 (phr) | 25 | 22.5 | 21.25 | 20 | 18.75 | 17.5 |
| Escorene LD400 ™ (phr) | 0 | 10 | 15 | 20 | 25 | 30 |
| Agerite MA (phr) | 0.5 | 0.5 | 0.5 | 0.5 | 0.5 | 0.5 |
| TAC (phr) | 0.4 | 0.4 | 0.4 | 0.4 | 0.4 | 0.4 |
| Mill Addition: | | | | | | |
| DiCup R (phr) | 2.6 | 2.6 | 2.6 | 2.6 | 2.6 | 2.6 |
| Cure Characteristics (ODR - 200° C., 3° Arc, 6 min motor) | | | | | | |
| $M_L$ (dN-m) | 4.21 | 4.28 | 4.05 | 4.07 | 4.02 | 3.89 |
| $M_H$ (dN-m) | 73.4 | 71.0 | 65.9 | 72.9 | 70.9 | 69.5 |
| ts2 (min) | 0.6 | 0.78 | 0.66 | 0.77 | 0.84 | 0.8 |
| tc90 (min) | 2.0 | 2.18 | 2.01 | 2.16 | 2.24 | 2.19 |
| tc98 (min) | 2.5 | 2.74 | 2.57 | 2.72 | 2.79 | 2.78 |
| cure rate (dN-m/min) | 31.4 | 29.1 | 26.5 | 29.3 | 28.5 | 26.4 |
| cure state $M_H - M_L$ (dN-m) | 69.2 | 66.7 | 61.9 | 68.8 | 66.9 | 65.6 |
| Physical Properties (Press cured 20 min, 165° C.) | | | | | | |
| 100% Modulus (MPa) | 1.6 | 2.0 | 2.3 | 2.5 | 2.8 | 3.0 |
| 200% Modulus (MPa) | 1.9 | 2.4 | 2.8 | 3.1 | 3.4 | 3.7 |

TABLE 4-continued

Unfilled Formulations With EP-1/PP-1/LDPE Blend

| | EXAMPLE | | | | | |
|---|---|---|---|---|---|---|
| | 5 | 6 | 7 | 8 | 9 | 10 |
| 300% Modulus (MPa) | 2.4 | 3.2 | 3.6 | 4.2 | 4.3 | 4.8 |
| Tensile Strength (MPa) | 3.7 | 5.0 | 5.8 | 5.5 | 8.0 | 7.3 |
| Break Elongation (%) | 385 | 394 | 393 | 355 | 419 | 389 |
| Dissipation Factor (600 V, 60 Hz, room temp) (days in 90° C. water) | | | | | | |
| Original, 0 days (dry) | 0.0011 | 0.0003 | 0.0004 | 0.0003 | 0.0013 | 0.0010 |
| 1 day | 0.0006 | 0.0007 | 0.0003 | 0.0002 | 0.0020 | 0.0011 |
| 7 days | 0.0008 | 0.0005 | 0.0010 | 0.0011 | 0.0006 | 0.0012 |
| 14 days | 0.0012 | 0.0004 | 0.0006 | 0.0015 | 0.0006 | 0.0011 |
| 28 days | 0.0010 | 0.0012 | 0.0015 | 0.0010 | 0.0005 | 0.0006 |

Examples 11–16

Table 5 shows the cure characteristics, physical properties, and electrical performance of unfilled compounds containing blends of Vistalon™ 1703P, PP-1, and Escorene LD400™ except Example 5 which is a formulation that contains only Vistalon™ 1703P and PP-1. Compared to the formulations of Table 4, Examples 11–16 have higher tensile strength due to the higher crystallinity of Vistalon™ 1703P. The progressive addition of Escorene LD400™ increases the tensile strength relative to Example 11.

TABLE 5

Unfilled Formulations With EPDM/PP-1/LDPE Blend

| | EXAMPLE | | | | | |
|---|---|---|---|---|---|---|
| | 11 | 12 | 13 | 14 | 15 | 16 |
| Materials Used | | | | | | |
| Vistalon ™ 1703P (phr) | 75 | 67.5 | 63.75 | 60 | 56.25 | 52.5 |
| PP-1 (phr) | 25 | 22.5 | 21.25 | 20 | 18.75 | 17.5 |
| Escorene LD400 ™ (phr) | 0 | 10 | 15 | 20 | 25 | 30 |
| Agerite MA (phr) | 0.5 | 0.5 | 0.5 | 0.5 | 0.5 | 0.5 |
| Mill Addition: | | | | | | |
| DiCup R (phr) | 2.6 | 2.6 | 2.6 | 2.6 | 2.6 | 2.6 |
| Cure Characteristics (ODR - 200° C., 3° Arc, 6 min motor) | | | | | | |
| $M_L$ (dN-m) | 5.75 | 5.40 | 4.80 | 4.99 | 5.07 | 5.05 |
| $M_H$ (dN-m) | 65.7 | 65.9 | 58.5 | 64.0 | 61.3 | 59.9 |
| ts2 (min) | 0.66 | 0.82 | 0.66 | 0.8 | 0.84 | 0.98 |
| tc90 (min) | 2.0 | 2.19 | 1.98 | 2.15 | 2.19 | 2.36 |
| tc98 (min) | 2.56 | 2.78 | 2.59 | 2.75 | 2.45 | 2.97 |
| cure rate (dN-m/min) | 62.5 | 60.2 | 54.4 | 60.0 | 55.7 | 53.2 |
| cure state $M_H - M_L$ (dN-m) | 60.0 | 60.5 | 53.7 | 59.0 | 56.3 | 54.8 |
| Physical Properties (Press cured 20 min, 165° C.) | | | | | | |
| Hardness (Shore A) | 73 | 77 | 79 | 81 | 82 | 83 |
| 100% Modulus (MPa) | 2.2 | 2.6 | 2.7 | 2.9 | 3.0 | 3.4 |
| 200% Modulus (MPa) | 3.0 | 3.4 | 3.5 | 3.8 | 3.9 | 4.3 |
| 300% Modulus (MPa) | 4.8 | 5.2 | 5.0 | 5.6 | 5.6 | 6.1 |
| Tensile Strength (MPa) | 7.5 | 7.6 | 8.8 | 10.1 | 9.3 | 9.2 |
| Break Elongation (%) | 358 | 353 | 392 | 381 | 381 | 375 |
| Dissipation Factor (600 V, 60 Hz, room temp) (days in 90° C. water) | | | | | | |
| Original, 0 days (dry) | 0.0001 | 0.0010 | 0.0001 | 0.0001 | 0.0001 | 0.0002 |
| 1 day | 0.0002 | 0.0011 | 0.0001 | 0.0001 | 0.0002 | 0.0003 |
| 7 days | 0.0006 | 0.0003 | 0.0012 | 0.0021 | 0.0010 | 0.0005 |
| 14 days | 0.0006 | 0.0015 | 0.0021 | 0.0011 | 0.0001 | 0.0005 |
| 21 days | 0.0007 | 0.0014 | 0.0011 | 0.0001 | 0.0002 | 0.0011 |
| 28 days | 0.0011 | 0.0010 | 0.0015 | 0.0017 | 0.0017 | 0.0011 |

Examples 17–30

Tables 6, 7, and 8 show the cure characteristics, physical properties, and electrical performance of unfilled formulations that were prepared according to a mixture design of experiment, wherein the design variables were Vistalon™ 1703P, PP-1, and Escorene LD400™. Regression models constructed from the experimental data illustrate that cure properties are influenced by Vistalon™ 1703P, and physical properties are influenced by PP-1.

TABLE 6

Unfilled Formulations With EPDM/PP-1/LDPE Blend
Cure Characteristics

| | EXAMPLE | | | | | | | | | | | | | |
|---|---|---|---|---|---|---|---|---|---|---|---|---|---|---|
| | 17 | 18 | 19 | 20 | 21 | 22 | 23 | 24 | 25 | 26 | 27 | 28 | 29 | 30 |
| Materials Used | | | | | | | | | | | | | | |
| Vistalon ™ 1703P (phr) | 10 | 30 | 30 | 40 | 30 | 70 | 10 | 55 | 70 | 50 | 70 | 50 | 50 | 10 |
| PP-1 (phr) | 50 | 30 | 70 | 40 | 70 | 10 | 50 | 25 | 30 | 10 | 30 | 10 | 50 | 70 |
| Escorene LD400 ™ (phr) | 40 | 40 | 0 | 20 | 0 | 20 | 40 | 20 | 0 | 40 | 0 | 40 | 0 | 20 |
| Agerite MA (phr) | 0.5 | 0.5 | 0.5 | 0.5 | 0.5 | 0.5 | 0.5 | 0.5 | 0.5 | 0.5 | 0.5 | 0.5 | 0.5 | 0.5 |
| Mill Addition: | | | | | | | | | | | | | | |
| DiCup R (phr) | 2.6 | 2.6 | 2.6 | 2.6 | 2.6 | 2.6 | 2.6 | 2.6 | 2.6 | 2.6 | 2.6 | 2.6 | 2.6 | 2.6 |
| Cure Characteristics (ODR - 200° C., 3° Arc, 6 min motor) | | | | | | | | | | | | | | |
| $M_L$ (dN-m) | 3.03 | 4.23 | 4.12 | 4.58 | 4.20 | 5.47 | 3.23 | 4.91 | 4.45 | 5.57 | 4.75 | 5.62 | 5.23 | 3.46 |
| $M_H$ (dN-m) | 28.4 | 44.3 | 25.3 | 43.4 | 25.6 | 71.7 | 29.1 | 36.9 | 60.5 | 61.4 | 59.9 | 60.2 | 57.8 | 21.6 |
| ts2 (min) | 0.92 | 1.19 | 1.16 | 1.15 | 1.1 | 1.01 | 1.11 | 1.03 | 0.96 | 0.84 | 0.87 | 0.83 | 1.06 | 1.16 |
| tc90 (min) | 2.3 | 2.61 | 2.61 | 2.57 | 2.52 | 2.35 | 2.5 | 2.48 | 2.29 | 2.21 | 2.18 | 2.17 | 2.44 | 2.53 |
| tc98 (min) | 2.86 | 3.23 | 3.20 | 3.15 | 3.07 | 2.96 | 3.06 | 3.05 | 2.87 | 2.80 | 2.75 | 2.74 | 3.03 | 3.09 |
| cure rate (dN-m/min) | 20.4 | 34.6 | 14.6 | 32.7 | 15.3 | 71.9 | 20.9 | 25.1 | 58.5 | 55.2 | 57.3 | 54.9 | 51.4 | 13.3 |
| cure state $M_H - M_L$ (dN-m) | 25.3 | 40.1 | 21.1 | 38.8 | 21.4 | 66.3 | 25.9 | 32.0 | 56.0 | 55.8 | 55.2 | 54.6 | 52.6 | 18.1 |

TABLE 7

Unfilled Formulations With EPDM/PP-1/LDPE Blend
Physical Properties

| | EXAMPLE | | | | | | | | | | | | | |
|---|---|---|---|---|---|---|---|---|---|---|---|---|---|---|
| | 17 | 18 | 19 | 20 | 21 | 22 | 23 | 24 | 25 | 26 | 27 | 28 | 29 | 30 |
| Materials Used | | | | | | | | | | | | | | |
| Vistalon ™ 1703P (phr) | 10 | 30 | 30 | 40 | 30 | 70 | 10 | 55 | 70 | 50 | 70 | 50 | 50 | 10 |
| PP-1 (phr) | 50 | 30 | 70 | 40 | 70 | 10 | 50 | 25 | 30 | 10 | 30 | 10 | 50 | 70 |
| Escorene LD400 ™ (phr) | 40 | 40 | 0 | 20 | 0 | 20 | 40 | 20 | 0 | 40 | 0 | 40 | 0 | 20 |
| Agerite MA (phr) | 0.5 | 0.5 | 0.5 | 0.5 | 0.5 | 0.5 | 0.5 | 0.5 | 0.5 | 0.5 | 0.5 | 0.5 | 0.5 | 0.5 |
| Mill Addition: | | | | | | | | | | | | | | |
| DiCup R (phr) | 2.6 | 2.6 | 2.6 | 2.6 | 2.6 | 2.6 | 2.6 | 2.6 | 2.6 | 2.6 | 2.6 | 2.6 | 2.6 | 2.6 |
| Physical Properties (Press cured 20 min, 165° C.) | | | | | | | | | | | | | | |
| Hardness (Shore A) | 85 | 84 | 74 | 80 | 74 | 79 | 85 | 77 | 76 | 86 | 76 | 86 | 74 | 79 |
| 100% Modulus (MPa) | 4.0 | 3.9 | 2.5 | 3.2 | 2.3 | 3.5 | 4.0 | 3.3 | 2.4 | 4.1 | 2.3 | 4.0 | 2.5 | 2.9 |
| 200% Modulus (MPa) | 4.6 | 5.0 | 2.8 | 4.0 | 2.8 | 4.7 | 4.6 | 4.3 | 3.1 | 5.2 | 3.0 | 5.1 | 3.1 | 3.4 |
| 300% Modulus (MPa) | 5.7 | ? | 3.5 | 5.4 | 3.6 | 6.8 | 5.6 | 5.9 | 4.4 | 6.9 | 4.3 | 6.8 | 4.2 | 4.3 |
| Tensile Strength (MPa) | 7.2 | 5.1 | 14.0 | 11.0 | 11.9 | 8.6 | 16.2 | 8.8 | 7.4 | 10.0 | 7.4 | 8.9 | 11.0 | 13.8 |
| Break Elongation (%) | 373 | 242 | 519 | 414 | 475 | 334 | 493 | 379 | 380 | 380 | 381 | 372 | 439 | 522 |

TABLE 8

Unfilled Formulations With EPDM/PP-1/LDPE Blend
Electrical Performance

| | EXAMPLE | | | | | | | | | | | | | |
|---|---|---|---|---|---|---|---|---|---|---|---|---|---|---|
| | 17 | 18 | 19 | 20 | 21 | 22 | 23 | 24 | 25 | 26 | 27 | 28 | 29 | 30 |
| Materials Used | | | | | | | | | | | | | | |
| Vistalon ™ 1703P (phr) | 10 | 30 | 30 | 40 | 30 | 70 | 10 | 55 | 70 | 50 | 70 | 50 | 50 | 10 |
| PP-1 (phr) | 50 | 30 | 70 | 40 | 70 | 10 | 50 | 25 | 30 | 10 | 30 | 10 | 50 | 70 |
| Escorene LD400 ™ (phr) | 40 | 40 | 0 | 20 | 0 | 20 | 40 | 20 | 0 | 40 | 0 | 40 | 0 | 20 |
| Agerite MA (phr) | 0.5 | 0.5 | 0.5 | 0.5 | 0.5 | 0.5 | 0.5 | 0.5 | 0.5 | 0.5 | 0.5 | 0.5 | 0.5 | 0.5 |
| Mill Addition: | | | | | | | | | | | | | | |
| DiCup R (phr) | 2.6 | 2.6 | 2.6 | 2.6 | 2.6 | 2.6 | 2.6 | 2.6 | 2.6 | 2.6 | 2.6 | 2.6 | 2.6 | 2.6 |
| Dissipation Factor* | | | | | | | | | | | | | | |
| Original, 0 days (dry) | 0.0014 | 0.0004 | 0.0005 | 0.0001 | 0.0005 | 0.0012 | 0.0014 | 0.0001 | 0.0023 | 0.0004 | 0.0001 | 0.0004 | 0.0004 | 0.0004 |
| 1 day | 0.0011 | 0.0003 | 0.0004 | 0.0005 | 0.0004 | 0.0025 | 0.0011 | 0.0002 | 0.0004 | 0.0008 | 0.0005 | 0.0007 | 0.0011 | 0.0005 |
| 7 days | 0.0004 | 0.0002 | 0.0004 | 0.0003 | 0.0005 | 0.0013 | 0.0005 | 0.0002 | 0.0003 | 0.0004 | 0.0002 | 0.0003 | 0.0004 | 0.0004 |
| 14 days | 0.0011 | 0.0011 | 0.0012 | 0.0011 | 0.0013 | 0.0011 | 0.0011 | 0.0015 | 0.0012 | 0.0023 | 0.0015 | 0.0012 | 0.0012 | 0.0011 |
| 21 days | 0.0013 | 0.0010 | 0.0012 | 0.0013 | 0.0012 | 0.0028 | 0.0013 | 0.0012 | 0.0011 | 0.0009 | 0.0011 | 0.0009 | 0.0007 | 0.0013 |
| 28 days | 0.0002 | 0.0004 | 0.0004 | 0.0006 | 0.0005 | 0.0009 | 0.0001 | 0.0011 | 0.0004 | 0.0005 | 0.0004 | 0.0004 | 0.0006 | 0.0012 |

*600 V, 60 Hz, room temp (days in 90° C. water)

Examples 31–33

Table 9 shows the cure characteristics, physical properties, and electrical performance of unfilled compounds containing blends of Vistalon™ 1703P, PP-1, and Escorene LD400™. Examples 32–33 have improved tensile strength and elongation relative to Example 31, which contains only Vistalon™ 1703P.

TABLE 9

Unfilled Formulations With EPDM/PP-1/LDPE Blend

| EXAMPLE | 31 | 32 | 33 |
|---|---|---|---|
| Materials Used | | | |
| Vistalon ™ 1703P (phr) | 100 | 54.96 | 41.98 |
| PP-1 (phr) | 0 | 24.51 | 36.74 |
| Escorene LD400 ™ (phr) | 0 | 20.53 | 21.28 |
| Agerite MA (phr) | 0.5 | 0.5 | 0.5 |
| Mill Addition: | | | |
| DiCup R (phr) | 2.6 | 2.6 | 2.6 |
| Cure Characteristics (ODR - 200° C., 3° Arc, 6 min motor) | | | |
| $M_L$ (dN-m) | 6.93 | 4.09 | 2.92 |
| $M_H$ (dN-m) | 91.1 | 49.4 | 34.4 |
| ts2 (min) | 0.59 | 0.81 | 0.84 |
| tc90 (min) | 1.7 | 2.09 | 2.14 |
| tc98 (min) | 2.24 | 2.64 | 2.66 |
| cure rate (dN-m/min) | 111.8 | 45.7 | 28.2 |
| cure state | 84.2 | 45.3 | 31.5 |
| $M_H - M_L$ (dN-m) | | | |
| Physical Properties (Press cured 20 min, 165° C.) | | | |
| Hardness (Shore A) | 73 | 72 | 70 |
| 100% Modulus (MPa) | 2.4 | 3.0 | 2.4 |
| 200% Modulus (MPa) | 3.4 | 4.0 | 3.2 |
| 300% Modulus (MPa) | 5.0 | 5.5 | 4.6 |
| Tensile Strength (MPa) | 4.9 | 6.9 | 9.8 |
| Break Elongation (%) | 263 | 338 | 412 |
| Dissipation Factor (600 V, 60 Hz, room temp) (days in 90° C. water) | | | |
| Original, 0 days (dry) | 0.0011 | 0.0010 | 0.0010 |
| 1 day | 0.0011 | 0.0008 | 0.0012 |
| 7 days | 0.0011 | 0.0012 | 0.0008 |
| 14 days | 0.0005 | 0.0021 | 0.0013 |
| 28 days | 0.0015 | 0.0021 | 0.0013 |

Example 34

Table 10 shows the cure characteristics, physical properties, and electrical performance of a particular unfilled compound containing a blend of Vistalon™ 1703P, PP-1, and Escorene LD400™. In Example 34, peroxide was added to the masterbatch in a second pass in the internal mixer.

TABLE 10

Unfilled Formulation With EPDM/PP-1/LDPE Blend

| EXAMPLE | 34 |
|---|---|
| Materials Used | |
| Vistalon ™ 1703P (phr) | 41.98 |
| PP-1 (phr) | 36.74 |
| Escorene LD400 ™ (phr) | 21.28 |
| Agerite MA (phr) | 0.5 |
| Second Pass: | |
| DiCup R (phr) | 2.6 |
| Cure Characteristics | |
| (ODR - 200° C., 3° Arc, 6 min motor) | |
| $M_L$ (dN-m) | 4.81 |
| $M_H$ (dN-m) | 46.1 |
| ts2 (min) | 0.73 |
| tc90 (min) | 2.03 |
| tc98 (min) | 2.56 |
| cure rate (dN-m/min) | 38.0 |
| cure state $M_H$ – $M_L$ (dN-m) | 41.3 |
| Physical Properties | |
| (Press cured 20 min, 165° C.) | |
| Hardness (Shore A) | 79 |
| 100% Modulus (MPa) | 3.3 |
| 200% Modulus (MPa) | 4.1 |
| 300% Modulus (MPa) | 5.8 |
| Tensile Strength (MPa) | 11.5 |
| Break Elongation (%) | 407 |
| Dissipation Factor | |
| (600 V, 60 Hz, room temp) | |
| (days in 90° C. water) | |
| Original, 0 days (dry) | 0.0011 |
| 1 day | 0.0011 |
| 7 days | 0.0011 |
| 14 days | 0.0011 |
| 28 days | 0.0007 |

The formulation of Example 34 was used for a wire line trial. Table 11 shows the process condition for the wire line extruder and the continuous vulcanization tube used in the trial. The formulation was extruded over a 14 gauge solid copper wire. The insulation thickness was 0.76 mm concentric over the copper wire. The line speed used in the trial was set at 0.61 m/min, which provided a residence time of about 3.3 minutes in the CV tube. The formulation showed no deficiency in processability on the wire line.

TABLE 11

| Wire Line Process Conditions | | Set/Actual |
|---|---|---|
| Extruder Zone 1 | ° C. | 99/98 |
| Zone 2 | ° C. | 100/101 |
| Zone 3 | ° C. | 102/102 |
| Clamp | ° C. | 102/102 |
| Flange | ° C. | 102/103 |
| Body | ° C. | 102/103 |
| Die | ° C. | 102/119 |
| Melt Temperature | ° C. | 100 |
| Line Speed | m/min | 0.61 |
| Line Speed Master | % | 25 |
| Extruder Ref | % | 50 |
| Capstan Ref | % | 100 |
| Extruder RPM | RPM | 12.5 |
| Extruder Head Pressure | MPa | 14.8 |
| Steam Pressure | MPa | 1.7 |
| CV Cure Temp | ° C. | 208 |
| Water Level | m | 0.7 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

We claim:

1. An electrically conductive device comprising:
   (a) an electrically conductive portion; and
   (b) an electrically insulating portion comprising an electrical insulation compound, the insulation compound comprising a blend of:
      (1) at least 10 wt %, based on the total weight of the insulation compound, of an ethylene polymer comprising at least 40 wt % ethylene-derived units and having a density of $\leq 0.91$ g/cm$^3$; and
      (2) at least 10 wt %, based on the total weight of the insulation compound, of a propylene polymer comprising at least 75 wt % propylene-derived units having an isotactic propylene triad tacticity of from 65% to 99% and a heat of fusion of 1 J/g to 60 J/g..

2. The electrically conductive device of claim 1, wherein the ethylene polymer has a density of from 0.85 to 0.91 g/cm$^3$.

3. The electrically conductive device of claim 1, wherein the ethylene polymer has a density of from 0.86 to 0.89 g/cm$^3$.

4. The electrically conductive device of claim 1, wherein the ethylene polymer additionally comprises from 0.1 to 10 wt % diene-derived units.

5. The electrically conductive device of claim 1, wherein the ethylene polymer is an EP(D)M elastomer having a Mooney viscosity (ML [1+4] 125° C.) of from 10 to 80.

6. The electrically conductive device of claim 1, wherein the ethylene polymer has an MI of from 0.01 to 100 and an MIR ($I_{21}/I_2$) of at least 30.

7. The electrically conductive device of claim 1, wherein the electrical insulation compound includes less than 25 phr filler.

8. The electrically conductive device of claim 1, wherein the electrical insulation compound is substantially free of filler.

9. The electrically conductive device of claim 1, wherein the electrical insulation compound has a 28 day dissipation factor of less than 0.01.

10. An electrically conductive device comprising:
    (a) an electrically conductive portion; and
    (b) an electrically insulating portion comprising an electrical insulation compound, the insulation compound comprising a blend of:
       (1) at least 10 wt%, based on the total weight of the insulation compound, of an ethylene polymer comprising at least 40 wt% ethylene-derived units and having a density of ≦0.91 g/cm³; and (2) at least 10 wt%, based on the total weight of the insulation compound, of a propylene polymer comprising at least 75 wt% propylene-derived units having an isotactic propylene triad tacticity of from 65% to 99% and a heat of fusion of less than 75 J/g, wherein the propylene polymer of the electrical insulation compound additionally comprises from 0.1 to 10 wt% diene-derived units.

11. The electrically conductive device of claim 1, wherein the propylene polymer of the electrical insulation compound additionally comprises from 0.1 to 25 wt % ethylene-derived units.

12. The electrically conductive device of claim 1, wherein the propylene polymer of the electrical insulation compound additionally comprises from 0.1 to 25 wt % ethylene-derived units.

13. The electrically conductive device of claim 1, wherein the propylene polymer is present in the electrical insulation compound in an amount of at least 15 wt %, based on the total weight of the insulation compound.

14. The electrically conductive device of claim 1, wherein the ethylene polymer is present in the electrical insulation compound in an amount of at least 15 wt %, based on the total weight of the insulation compound.

15. The electrically conductive device of claim 1, wherein the ethylene polymer and propylene polymer constitute together at least 70 wt % of the electrical insulation compound.

16. The electrically conductive device of claim 1, wherein the ethylene polymer and propylene polymer constitute together at least 80 wt % of the electrical insulation compound.

17. An electrically conductive device comprising:
(a) an electrically conductive portion; and
(b) an electrically insulating portion comprising an electrical insulation compound, the insulation compound comprising a blend of:
(1) at least 10 wt%, based on the total weight of the insulation compound, of an ethylene polymer comprising at least 40 wt% ethylene-derived units and having a density of ≦0.91 g/cm³; and
(2) at least 10 wt%, based on the total weight of the insulation compound, of a propylene polymer comprising at least 75 wt% propylene-derived units having an isotactic propylene triad tacticity of from 65% to 99% and a heat of fusion of less than 75 J/g, wherein the electrical insulation compound additionally comprises an LDPE.

18. The electrically conductive device of claim 17, wherein the LDPE is present in the electrical insulation compound in an amount of at least 10 wt %, based on the total weight of the insulation compound.

* * * * *